(12) United States Patent
Doktorova et al.

(10) Patent No.: US 8,319,742 B2
(45) Date of Patent: Nov. 27, 2012

(54) PORTABLE ELECTRONIC DEVICE AND METHOD OF CONTROLLING SAME

(75) Inventors: Laura Doktorova, Mississauga (CA); Jason Tyler Griffin, Waterloo (CA); John Jong-Suk Lee, Waterloo (CA)

(73) Assignee: Research In Motion Limited, Waterloo (CA)

( * ) Notice: Subject to any disclaimer, the term of this patent is extended or adjusted under 35 U.S.C. 154(b) by 841 days.

(21) Appl. No.: 12/455,454

(22) Filed: Jun. 1, 2009

(65) Prior Publication Data

US 2010/0164879 A1 Jul. 1, 2010

Related U.S. Application Data

(60) Provisional application No. 61/091,854, filed on Aug. 26, 2008.

(51) Int. Cl.
*G09G 5/00* (2006.01)

(52) U.S. Cl. ........................................ 345/173; 345/169

(58) Field of Classification Search .......... 345/156–179; 178/18.01–18.11; 341/22, 23, 26, 34
See application file for complete search history.

(56) References Cited

U.S. PATENT DOCUMENTS

| 5,574,482 | A | 11/1996 | Niemeier | |
|---|---|---|---|---|
| 6,295,052 | B1 | 9/2001 | Kato et al. | |
| 7,199,786 | B2 | 4/2007 | Suraqui | |
| 7,202,853 | B2 * | 4/2007 | Ng et al. | 345/168 |
| 2009/0184932 | A1 * | 7/2009 | Alten | 345/173 |

OTHER PUBLICATIONS http://www.cootek.com/intro-tutorial.aspx, published at least as early as Oct. 28, 2009.
http://smartphonemag.com/cms/print/5767, published at least as early as Jun. 1, 2009.

* cited by examiner

*Primary Examiner* — Regina Liang
(74) *Attorney, Agent, or Firm* — Geoffrey deKleine; Borden Ladner Gervais LLP (57) ABSTRACT

A method of controlling a touch-sensitive display includes displaying a keyboard on the touch-sensitive display. A key of the keyboard is associated with at least two characters. Confirmation of selection is detected and a plurality of touch locations on the touch-sensitive display are detected. At least one of the plurality of touch locations is associated with the key. A direction is determined based on at least two of the plurality of touch locations and a first character of the at least two characters is selected based on the direction and confirmation of selection.

19 Claims, 8 Drawing Sheets

PORTABLE ELECTRONIC DEVICE AND METHOD OF CONTROLLING SAME

CROSS-REFERENCE TO RELATED APPLICATIONS

The present application claims the benefit of priority of U.S. Provisional Patent Application No. 61/091,854, filed Aug. 26, 2008, which is incorporated herein by reference.

FIELD OF TECHNOLOGY

The present disclosure relates to portable electronic devices including touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive or touchscreen devices are desirable.

DETAILED DESCRIPTION

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

Figure 1:
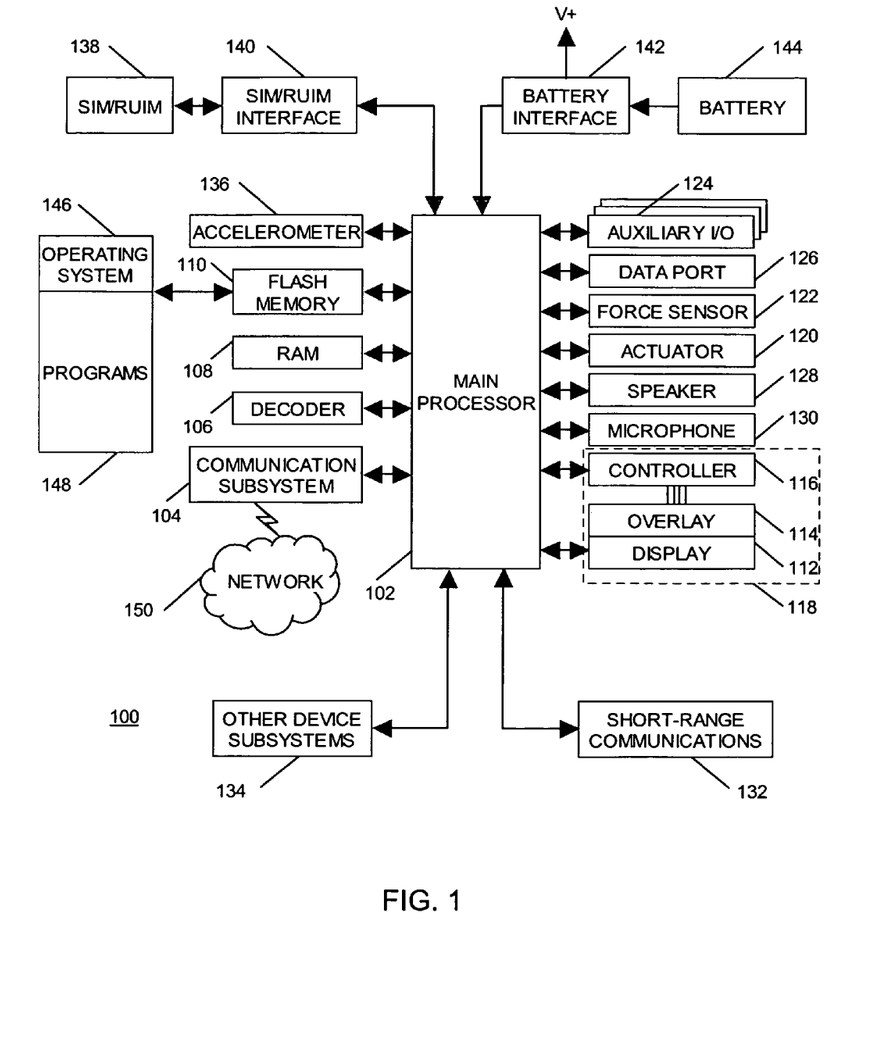
FIG. 1 is a block diagram of an embodiment of a portable electronic device in a communication system in accordance with the present description.

A block diagram of an example of an embodiment of a portable electronic device 100 is shown in FIG. 1. The portable electronic device 100 includes multiple components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

Figure 3:
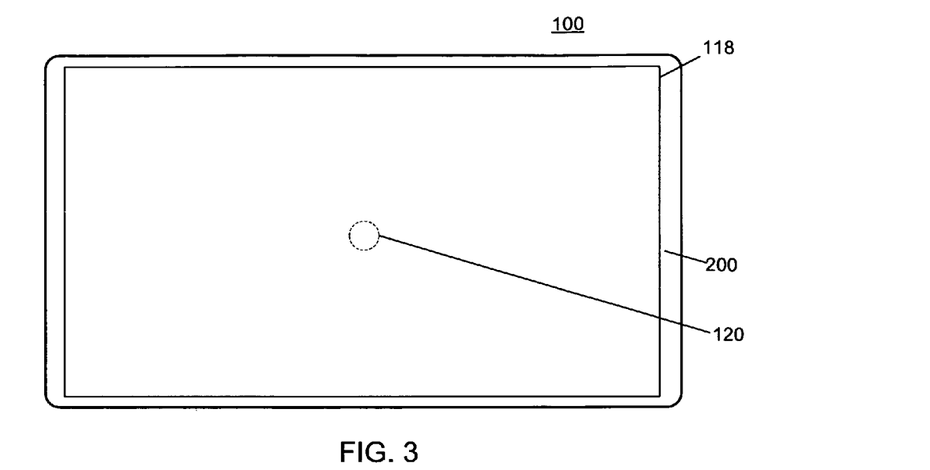

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator 120, such as shown in FIG. 3, one or more force sensors 122, an auxiliary input/output (I/O) subsystem 124, a data port 126, a speaker 128, a microphone 130, short-range communications 132 and other device subsystems 134. User-interaction with the graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
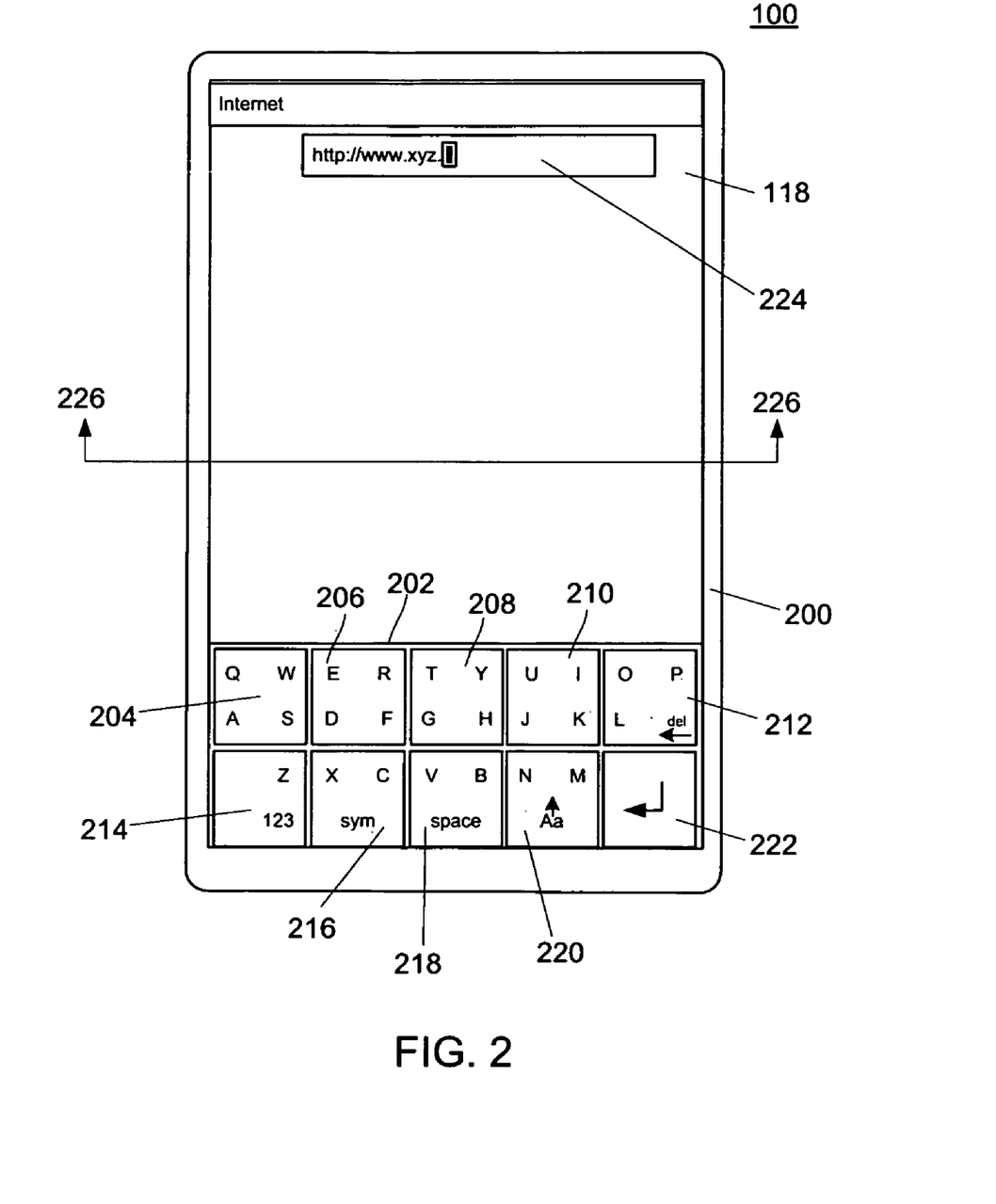
FIG. 2 and FIG. 3 illustrate a front view of a portable electronic device in accordance with the present description.

The portable electronic device 100 shown in FIG. 2 includes a housing 200 that encloses internal components, such as shown in FIG. 1, and frames the touch-sensitive display 118. The touch-sensitive display 118 may be any suitable touch-sensitive display, such as a capacitive touch-sensitive display 118, as known in the art. A capacitive touch-sensitive overlay 114 typically includes multiple layers in a stack, for example, a substrate fixed to the'display 112 by a suitable adhesive, a ground shield layer, a barrier layer, a pair of capacitive touch sensor layers separated by a substrate or other barrier layer, and a cover layer fixed to the second capacitive touch sensor layer by a suitable adhesive. Each of the capacitive touch sensor layers may be, for example, a layer of patterned indium tin oxide (ITO).

A reduced-area keyboard 202 is shown displayed with a plurality of keys or buttons. Each key is shown associated with one or more characters and/or functions. Several keys 204, 206, 208, 210 are shown associated with four characters, which are indicated by letters in this example. Other keys 212, 214, 216, 218, 220 are associated with characters and functions. One key 222 is shown associated only with a function, the "enter" key. The example of FIG. 2 shows a partial internet address in an entry field 224 in a browser application. Other organizations of characters may be utilized instead of those shown in the drawings, such as alphabetical, numerical, and so forth.

Figure 4:
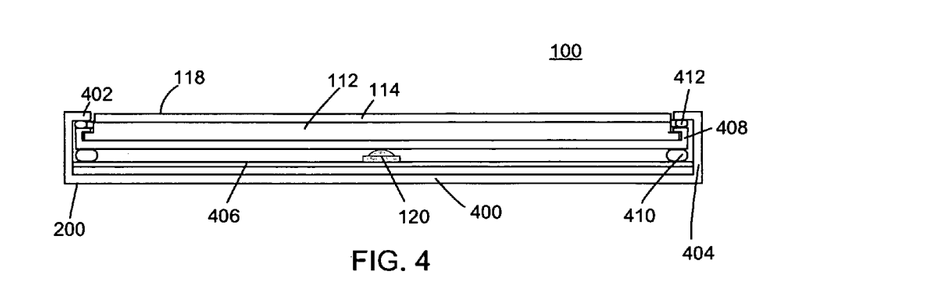
FIG. 4 is a cross-sectional view of the portable electronic device through line 226 of FIG. 2 in accordance with the present description.

A touch location, such as location of a user's touch on the touch-sensitive display 118, includes X and Y components (e.g., horizontal and vertical with respect to one's view of the touch-sensitive display 118, respectively). For example, the X location may be determined by a signal generated as a result of capacitive coupling with one of the touch sensor layers, and the Y location may be determined by a signal generated as a result of capacitive coupling with another of the touch sensor layers. Each of the touch-sensor layers provides a signal to the controller 116 as a result of capacitive coupling with a suitable object, such as a user's finger or object as known in the art. The signals include representations of the X and Y touch location values. Each application typically includes at least one map of locations associated with keys displayed for the application, facilitating easy selection of characters or functions with touch locations. The housing 200 as shown in FIG. 4 includes a back 400 and a frame 402 spaced from the back 400 that frames the touch-sensitive display 118, as shown in FIG. 4. Sidewalls 404 extend between the back 400 and the frame 402. A base 406 extends between the sidewalls 404, generally parallel to the back 400 and supports the actuator 120. The base 406 may be any suitable base, such as a printed circuit board or flex circuit board supported between the base 406 and the back 400.

Figure 5:
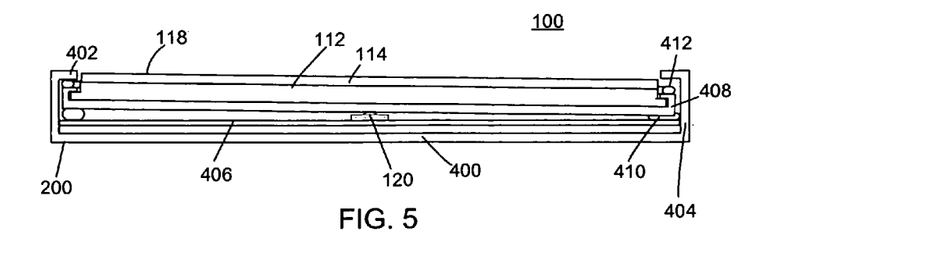
FIG. 5 is a cross-sectional view of the portable electronic device through line 226 of FIG. 2 during confirmation of selection in accordance with the present description.

The display 112 and the overlay 114 are supported on a support tray 408 of suitable material such as magnesium. The display 112 and overlay 114 are biased away from the base 406, toward the frame 402 by biasing elements 410 such as gel pads between the support tray 408 and the base 406. Compliant spacers 412, which may also be in the form of gel pads for example, are located between the support tray 408 and the frame 402. The touch-sensitive display 118 is moveable within the housing 200. As the touch-sensitive display 118 is moved toward the base 406, the biasing elements 410 are compressed, and when sufficient force is applied, the actuator 120 is depressed or actuated. The touch-sensitive display 118 may also pivot within the housing 200 to depress the actuator 120, where one side of the touch-sensitive display 118 moves toward the base 406 causing compression of the biasing elements 410 on that side of the touch-sensitive display 118, such as shown in FIG. 5. The actuator 120 may be actuated by pressing anywhere on the touch-sensitive display 118. For a mechanical dome switch actuator, tactile feedback is provided when the dome collapses due to imparted force and when the dome switch actuator returns to the rest position after release of the switch. Although a single actuator is shown, any suitable number of actuators may be utilized and may be located in any suitable position. Optionally, the actuator 120 may comprise one or more piezoelectric actuators between the base 406 and the support tray 408 for providing tactile feedback to the user. Each piezo actuator includes a piezoelectric device, such as a piezoelectric (PZT) ceramic disk adhered to a metal substrate such that the metal substrate bends when the PZT disk contracts as a result of build up of charge at the PZT disk. The charge may be adjusted by varying the applied voltage or current. When the charge reaches a predetermined amount, the charge may advantageously be removed over a relatively short period of time to provide tactile feedback to the user. The charge on the piezo actuator may be removed by a controlled discharge current that causes the PZT disk to expand, thereby releasing the force caused by the electric charge and decreasing the force on the touch-sensitive display 118 applied by the piezo actuators.

Figure 6:
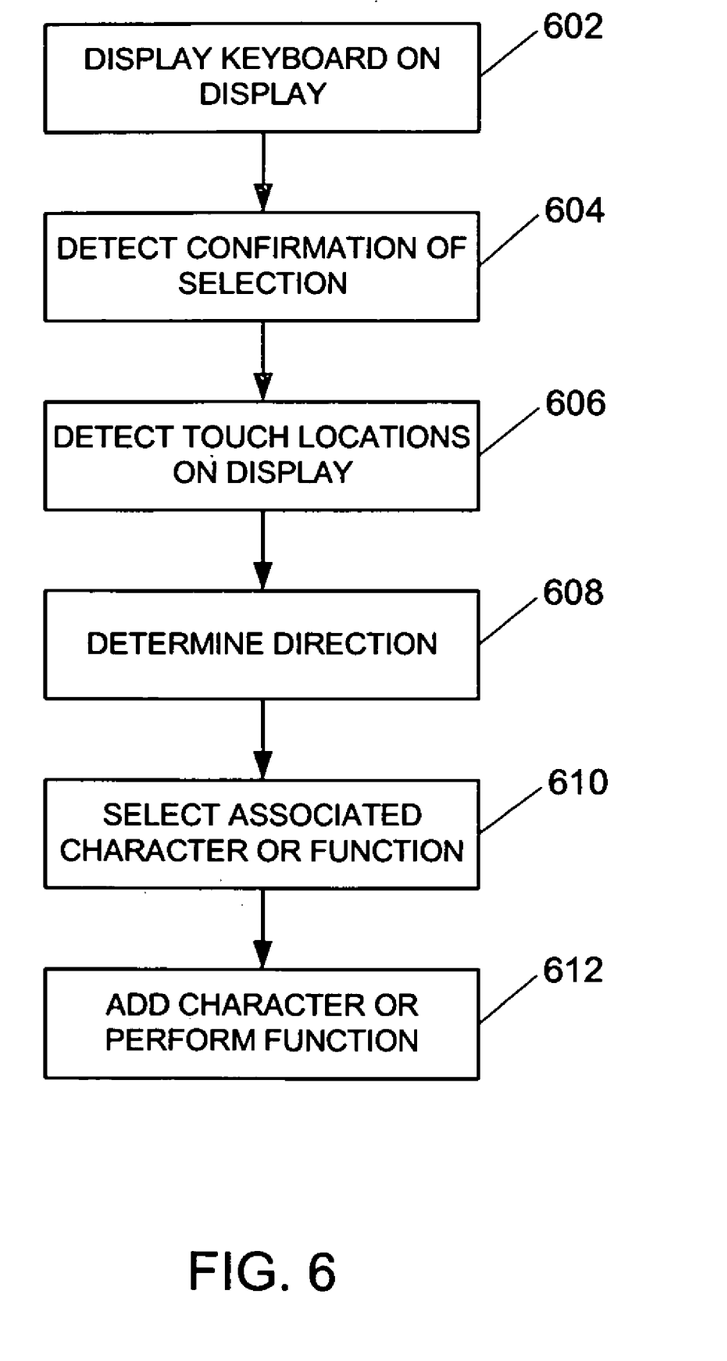
FIG. 6 is a flowchart showing a method of controlling an electronic device in accordance with the present description.

FIG. 6 is a flowchart showing a method of controlling an electronic device 100 in accordance with one embodiment. The steps of the method may be carried out by software executed by, for example, the processor 102. Coding of software for carrying out such steps is within the scope of a person of ordinary skill in the art given the present description. The method shown and described with respect to the flowchart of FIG. 6 is simplified for the purpose of the present explanation, and other steps and/or sub-steps may be included.

A graphical user interface is utilized to display 602 or render a keyboard 202 on the display 112. The graphical user interface may be provided in any suitable application, such as a web browser, email application, media player, and so forth.

Confirmation of selection is detected 604, for example, by receipt of a signal that indicates actuation of the actuator 120. A plurality of touch locations are detected 606 on the touch-sensitive display 118, as described above. A key is associated with the at least one of the plurality of touch locations, such as the touch location associated with confirmation of selection, a beginning location of a swipe, an end location of a swipe, or other touch location.

Figure 10:
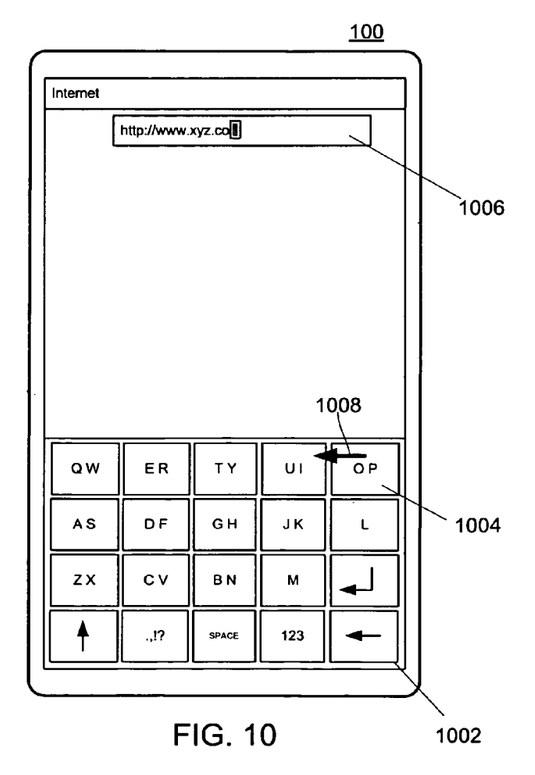
FIG. 10 illustrates an alternative keyboard displayed on a touch-sensitive display in accordance with the present description.

A direction is determined 608 from two locations selected from the plurality of detected touch locations. One of the selected touch locations is identified as a first location, and the other is identified as a second location. The direction is determined for the vector extending from the first location to the second location, as described below. The direction may be simplified depending on how many different characters/functions are associated with a given key. For example, when four characters/functions are associated with a key, such as shown in FIG. 2, the direction may be identified as one of four directions pointing toward one of the four corners of a square. When two characters/functions are associated with a key, such as shown in FIG. 10, the direction may be identified as one of two directions pointing left or right, or alternatively up and down, if the keys were displayed one over the other instead of side-by-side. The first location and/or the second location may be associated with one of the keys and/or may be associated with the touch location of the confirmation of selection. The first and second locations may both be positioned in locations not associated with one of the keys, for example, in the area between the keyboard 202 and the entry field 224 of FIG. 2.

Confirmation of selection may take place at any time during the detection of the plurality of touch locations, from the first chronological touch to the last chronological touch. Advantage may be gained when the first touch location is the same as the location of the confirmation of selection. Different advantages may be obtained with the first or last chronological touches are the same as the location of the confirmation of selection. In other words, confirmation of selection may take place first or last in the touch event that results in the plurality of touch locations and their associated direction.

A character or function is selected 610 based on the direction and confirmation selection. When the direction is determined and confirmation of selection has been detected, one character or function is selected from among the characters and/or functions associated with a key associated with one of the plurality of touch locations.

The associated character/function may be selected by performing a lookup, for example, based on an index in a look-up table containing characters/functions associated with each key. An offset may be provided for each key and an index may be provided for each character/function associated with that key in the look-up table. The direction is correlated with the location of the character on the key, e.g., the corners, and also correlated to the index. In the example shown in FIG. 2, after determining the direction, the index is utilized to determine the character/function by adding the index to the offset. For example, the characters/functions may be assigned indexes of 0, 1, 2 and 3. For the direction associated with a corner for the character/function assigned the index of 1, results in an offset of the key offset+1. The determination of the direction, and thus, the index, may be determined from the difference between the X and Y values of the first and second locations. A threshold may be utilized when determining the direction.

An example of a portion of a look-up table is shown in Table 1, in which the QWAS key 204 is assigned a key offset of 1, the ERDF key 206 is assigned a key offset of 5, and the TYGH key 208 is assigned a key offset of 9. The upper-left corner of each key is assigned an index of 0, the upper-right corner of each key is assigned an index of 1, the lower-left corner of each key is assigned an index of 2, and the lower-right corner of each key is assigned an index of 3.

TABLE 1

| KEY OFFSET | INDEX | INDEX + OFFSET | CHARACTER/FUNCTION |
|---|---|---|---|
| 1 | 0 | 1 | Q |
| 1 | 1 | 2 | W |
| 1 | 2 | 3 | A |
| 1 | 3 | 4 | S |
| 5 | 0 | 5 | E |
| 5 | 1 | 6 | R |
| 5 | 2 | 7 | D |
| 5 | 3 | 8 | F |
| 9 | 0 | 9 | T |
| 9 | 1 | 10 | Y |
| 9 | 2 | 11 | G |
| 9 | 3 | 12 | H |
| ... | ... | ... | ... |

For example, a key offset of 1 is determined for a swipe with a starting position on the QWAS key 204. An index of 0 is determined when the swipe is in the direction of the upper-left corner. The total of the key offset+index is calculated to be 1 and the character associated with the total of 1 is determined to be a "Q". A key offset of 1 is determined for swipe with a starting position on the QWAS key 204. and an index of 3 is determined when the swipe is in the direction of the lower-right corner. The total of 4 is calculated, which is associated with an "S". A key offset of 5 is determined for a swipe with a starting position on the ERDF key 206, and an index of 1 is determined when the swipe is in the direction of the upper-right corner. The total of 6 is calculated and the associated character is an "R".

Examples of numerous touch events are illustrated in the graphical representations of the QWAS key 204 in FIG. 9A through FIG. 9D. For each example, a starting position of a touch, identified by a square, and a direction, indicated by an arrow, are illustrated, and the starting position of the touch is the touch location that is utilized to select the associated key. In other words, selection the QWAS key 204 in these examples begins with detection of a touch location within the boundaries of the QWAS key 204. This starting position is the first touch location, as described above. Movement of a finger while maintaining touch contact with the touch sensitive display 118 to another location identifies the second location, and thus, the direction. Confirmation of selection, combined with the direction, results in selection of one of the letters rendered on the QWAS key 204.

Figure 9A:
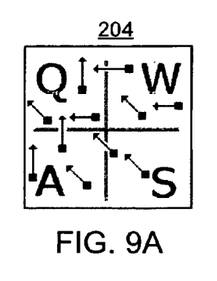
FIG. 9A through FIG. 9D illustrate directions associated with a key displayed on a touch-sensitive display in accordance with the present description.
Figure 9B:
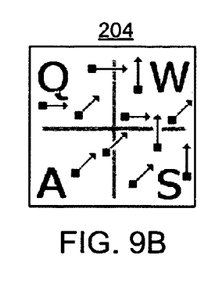
Figure 9C:
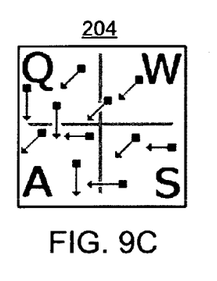
Figure 9D:
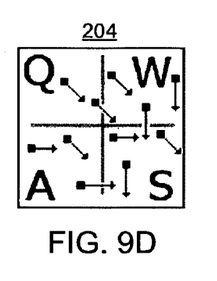

The letter "Q" may be selected, as shown in FIG. 9A, by a first touch location anywhere on the QWAS key 204, followed by a swipe up and to the left; a touch on the left side of the key 204, followed by a swipe in a direction straight up; or a first touch location in the upper-right quadrant of the key 204, followed by a swipe straight to the left. The letter "W" may be selected, as shown in FIG. 9B, by a first touch location anywhere on the QWAS key 204, followed by a swipe up and to the right; a first touch location on the right side of the key 204, followed by a swipe straight up; or a first touch location in the upper-left quadrant of the key 204, followed by a swipe straight to the right. The letter "A" may be selected, as shown in FIG. 9C, by a first touch location anywhere on the QWAS key 204, followed by a swipe down and to the left; a first touch location on the left side of the key 204, followed by a swipe straight down; or a first touch location in the lower-right quadrant of the key 204, followed by a swipe straight to the left. The letter "S" may be selected, as shown in FIG. 9D, by a first touch location anywhere on the QWAS key 204, followed by a swipe down and to the right; a touch on the right side of the key 204, followed a swipe straight down; or a first touch location in the lower-left quadrant of the key 204, followed by a swipe straight to the right. The second touch location may be located anywhere on the touch-sensitive display, including locations on or off the selected key. Alternatively, the start location, and the first touch location, may be considered to be the touch location of the confirmation of selection in the examples of FIG. 9A through FIG. 9D.

Prior to confirmation of selection, an attribute of a key may optionally change upon determination that any of the detected touch locations corresponds to a given key to thereby provide an indication of the key detected as touched. For example, the key may change by a change in colour, shading, bolding, size or any other suitable attribute to provide visual feedback to the user, identifying the key being touched and reducing the chance of user-error as a result of a misdirected touch. For example, when a user determines that the key touched is not the intended target key, the user may drag the contacting finger to the intended target prior to confirmation of selection. Thus, when determining the character/function based on the direction and a first touch location coincident with the confirmation of selection, the user may drag or move the contacting finger along the touch-sensitive display 118 prior to confirmation of selection to more accurately select the intended character/function.

The associated character is added 612 to the entry field 224, such as a character in an email, or the associated function is performed 612 in the application, for example, a delete function, a return function a shift function, or other suitable function.

Figure 7:
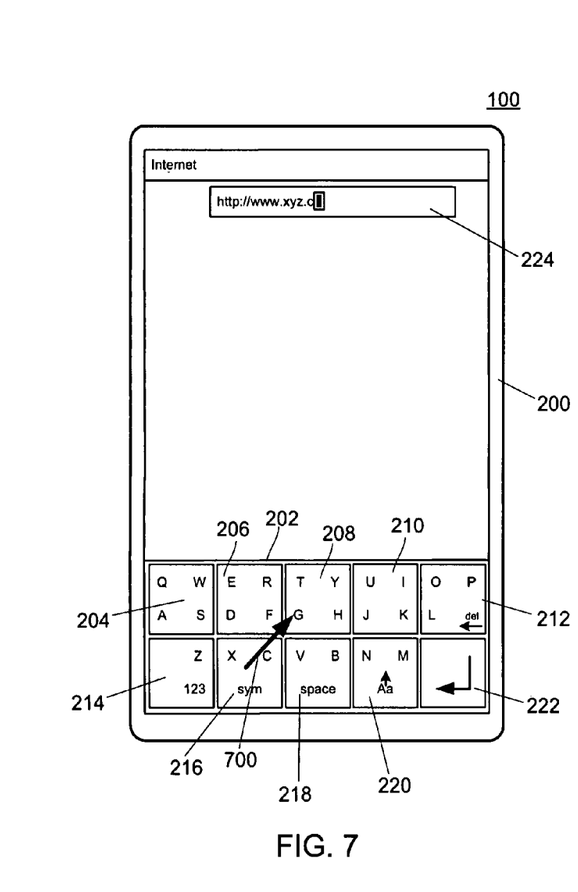
FIG. 7 and FIG. 8 illustrate examples of selecting letters from a reduced keyboard for entry in an entry field on a touch-sensitive display in accordance with the present description.
Figure 8:
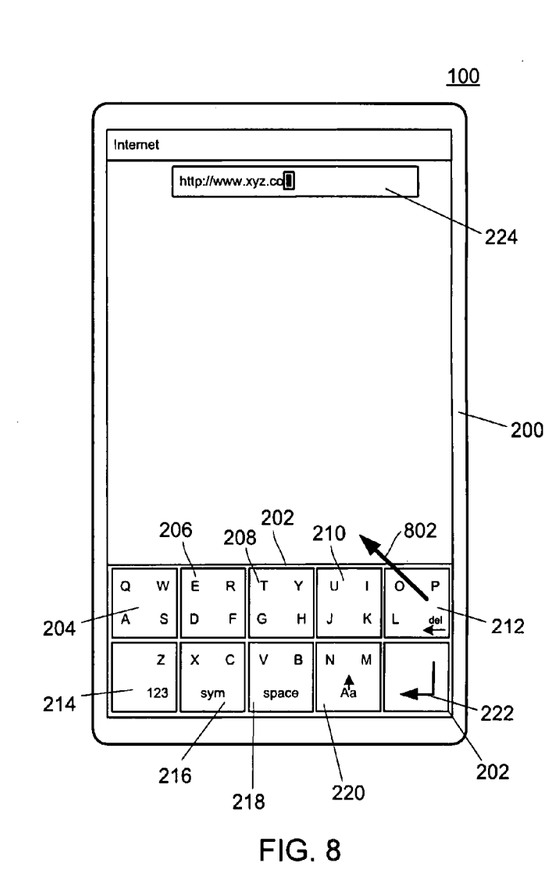

Examples of selecting letters from a reduced keyboard for entry in an entry field 224 on a touch-sensitive display 118 are shown in FIG. 7 and FIG. 8. The GUI is shown for an Internet browser and a reduced keyboard 202 is provided for data entry. In the example, "http://www.xyz." is entered in an entry field 224. The next character to be entered is the letter "c" that is displayed on the XC-SYM key 216, which is shared by the letters "x" and "c" and the function "sym" that changes the keyboard to display user-selectable symbols. In this example, the starting point of the arrow indicated the first touch location and the location of confirmation of selection, and the arrowhead indicates the endpoint, or the second touch location, of the swipe 802 to determine its direction. To achieve this end, the use touches the SC-SYM key 216, and immediately depresses the actuator 120, then drags the contact with the touch-sensitive display 118 to the "G" on the TYGH key 208. Thus, a "c" is selected and entered in the entry field 224.

As shown in FIG. 8, the next character to be entered is the letter "o" that is displayed on the OPL-DEL key 212, which is shared by the letters "o," "p," and "l" and the function "delete" that deletes information from the entry field 224. In this example, the starting point of the arrow indicated the first touch location and the location of confirmation of selection, and the arrowhead indicates the endpoint, or the second touch location, of the swipe to determine its direction. To achieve this end, the use touches the OPL-DEL key 212, and immediately depresses the actuator 120, then drags the contact with the touch-sensitive display 118 to the open area above the keyboard 202 through the "O" on the OPL-DEL key 212. Thus, an "o" is selected and entered in the entry field 224.

An alternative keyboard 1002 displayed on a touch-sensitive display 118 is shown in FIG. 10. In this embodiment, the keyboard 1002 includes keys that are each shared by two letters, including the OP key 1004 that is shared by the letters "o" and "p". For example, the user may select an "o" by depressing the touch-sensitive display 118 while touching a first touch location associated with the OP key 1004, to confirm selection, and swiping to the left, either straight to the left, up and to the left, or down and to the left. Once the "o" is selected, the display includes the "o" in the entry field 1024.

Optionally, the method may include determining a time period that the actuator 120 is maintained in the actuated state, for example before or after confirmation of selection, referred to as time of actuation. When the time of actuation is compared to a threshold value, such as two seconds, and, the time of actuation is equal to or exceeds the threshold time after confirmation, an attribute of the character may be changed. For example, a letter may be capitalized, italicized, underlined, or bolded. When the time of actuation meets or exceeds the threshold time before confirmation, different characters may be offered for selection, such as symbols or numerals or letters with accents. The one of the new characters may be selected, if the user elects to do so. If no selection is made after a given period, the display of new characters may be terminated and the previous display restored.

Figure 11:
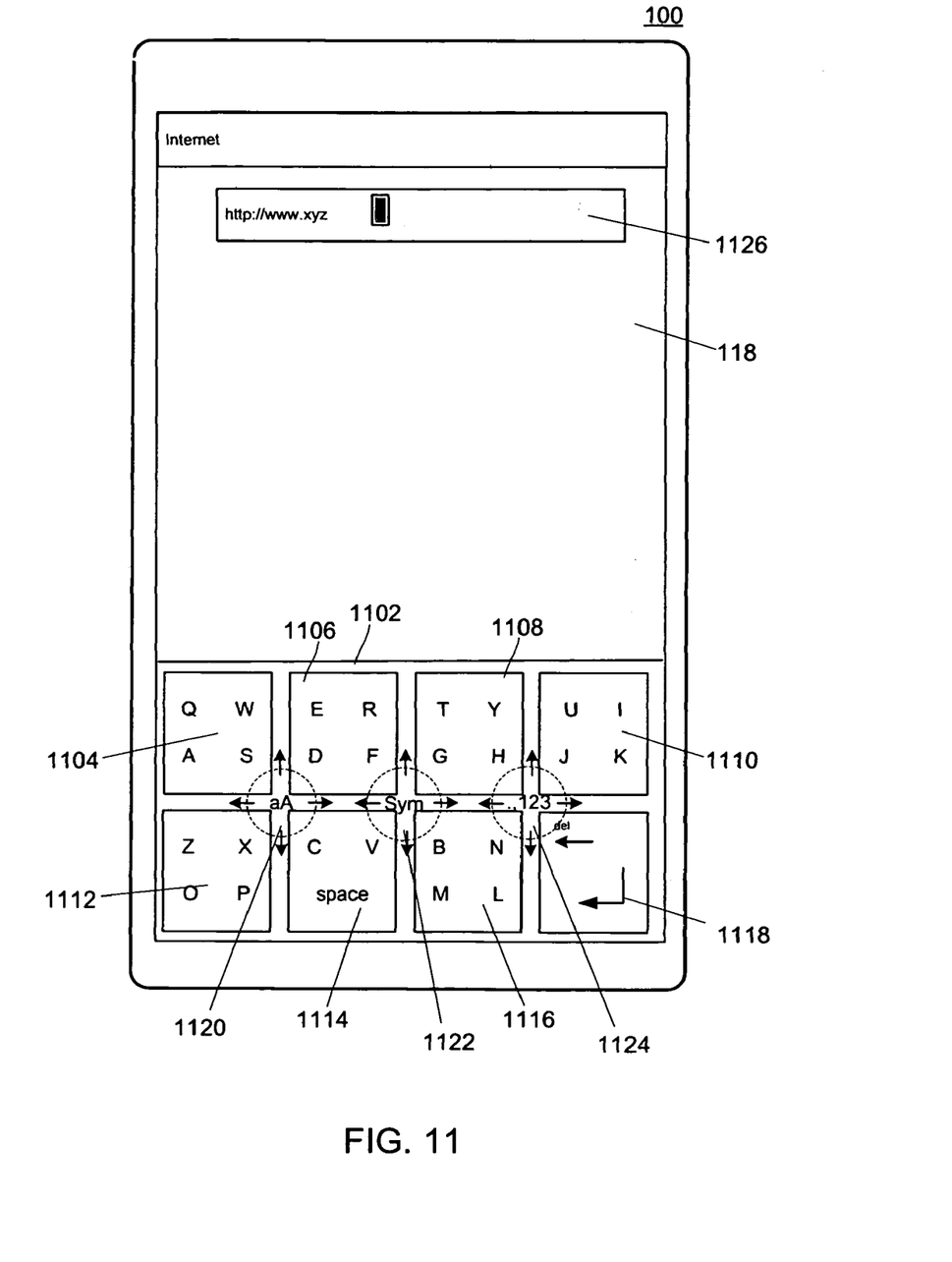
FIG. 11 illustrates functional areas displayed between keys on a touch-sensitive display in accordance with the present description.

Functional areas displayed between keys on a keyboard 1102 on a touch-sensitive display are illustrated in FIG. 11. Each of the keys of the keyboard 1102 is associated with multiple characters and/or functions, similar to the previous examples.

Three functional areas 1120, 1122, 1124 are displayed between the keys of the keyboard 1102, shown as the cross between the corners of four keys. As shown, the shift functional area 1120 is associated with the function of capitalizing and is located near the corners of the four left-side keys 1104, 1106, 1112, 1114. The symbol functional area 1122 is associated with a symbol function that displays symbols for user-selection and is located near the corners of the middle keys 1106, 1108, 1114, 1116. The numeric functional area 1124 is associated with punctuation and numeric functions that display punctuation and numerals for user-selection and is located near the corners of the right-side keys 1108, 1110, 1116, 1118. The functional areas 1120, 1122, 1124 are selected the same way the keys of the keyboard are selected, as described above, when the appropriate touch location is associated with a functional area 1120, 1122, 1124.

Although three functional areas are shown in FIG. 10, any number of functional areas may be provided. For example, one or more functional areas may be provided. Further, one or more of the areas may be associated with multiple functions, similar to how more than one character/function is associated with a key. The functional areas may also be located along the outermost edges of the keyboard 1102. The shape of the keys may also be changed to increase the area allocated to the functional areas. For example, a small part of the lower-right part of the first key 1104 and the lower-left part of the second key 1106 may be truncated and associated with the shift functional area 1120. Similarly, a small part of the upper-right part of the third key 1112 and the upper-left part of the fourth key 1114 may be truncated and associated with the shift functional area 1120.

Other features may be utilized in combination with the method described herein, including double-tapping for alternative functions, predictive text mode, and calibrations of various kinds to the users habits, characteristics, and/or preferences.

Figure 12:
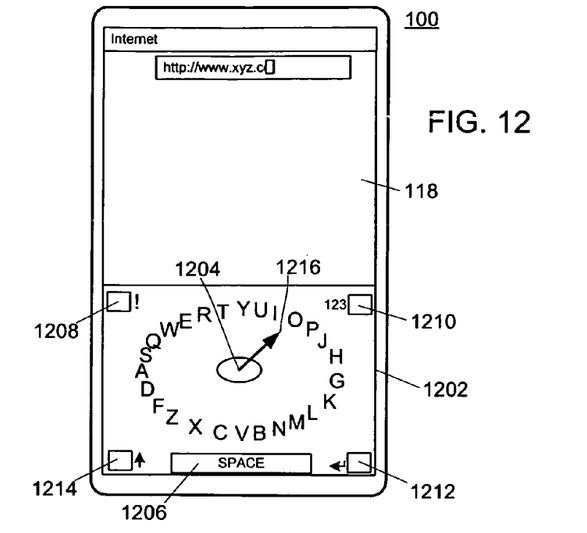
FIG. 12 through FIG. 14 illustrate an example of another alternative keyboard displayed on a touch-sensitive display in accordance with the present description.
Figure 13:
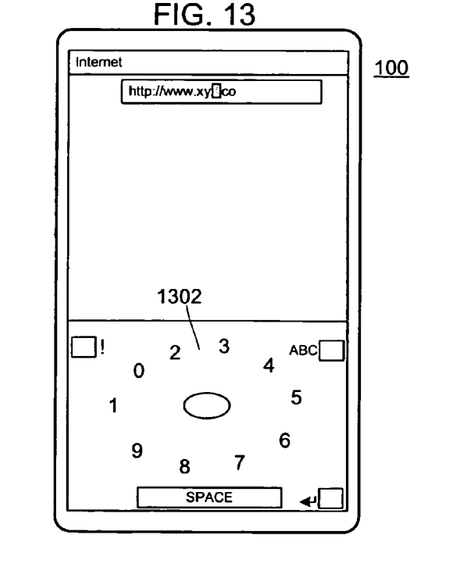
Figure 14:
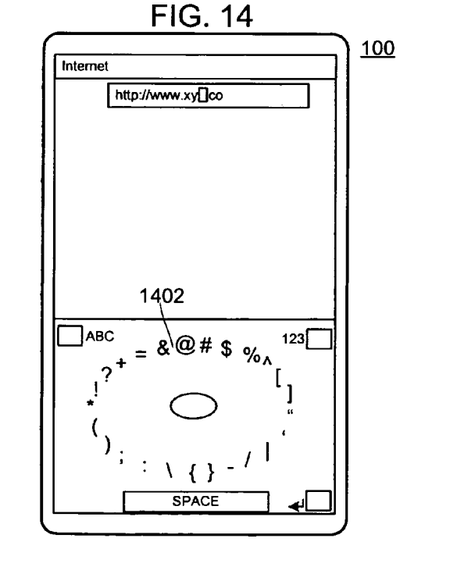

An example of another alternative keyboard displayed on a touch-sensitive display is shown in FIG. 12 through FIG. 14. In this example, the keyboard 1202 includes six keys 1204, 1206, 1208, 1210, 1212, 1214. The first key 1204 is generally oval in shape and is associated with a plurality of characters arranged in a pattern outside the key 1204. In the example of FIG. 12, the letters of the alphabet are arranged in an oval pattern outside the key 1204, which therefore is associated with 26 characters. The second key 1206 is associated with a space and is located below the pattern of the characters associated with the first key 1204. Four keys 1208, 1210, 1212, 1214 are associated with functions and are located near each of the corners of the keyboard area 1202. The four keys 1208, 1210, 1212, 1214 may include, for example, a key 1208 that displays symbols, a key 1210 that displays numerals, an "enter" key 1212, and a shift key 1214 that capitalizing letters. When the numeric key 1210 is selected, in any way utilized to select a key, numeric characters are displayed in a numeric keyboard 1302, such as shown in FIG. 13. Similarly, selection of the symbol key 1208 results in display of symbols in a symbolic keyboard 1402, such as shown in FIG. 14.

Selection of a character, such as a letter, number, punctuation mark or symbol, occurs in a manner similar to that described above. In this embodiment, the first touch location falls in the first key 1204, and the second touch location is positioned along a line that extends from the first key 1204 through the character, i.e., the direction of the line goes through or near the character selected. For example, to select an "o", a user may touch within the first key 1204 and extend the touch in the direction 1216 of the "o" character as indicated by the arrow. The letter "o" displayed on the keyboard 1202 may be highlighted, and/or may displayed in a larger font and/or may be displayed in new window that opens to show the letter being selected before confirmation of selection takes place. Confirmation of selection may take place while the first key 1204 is touched or anywhere along the line in the direction 1216 of the associated character. The second touch location may take place between the first key 1204 and the character, near the character, or outside the ring of characters. A similar process may be utilized to select numerals as shown in FIG. 13 or symbols/punctuations marks as shown in FIG. 14.

A method of controlling a touch-sensitive display includes displaying a keyboard on the touch-sensitive display. A key of the keyboard is associated with at least two characters. Confirmation of selection is detected and a plurality of touch locations on the touch-sensitive display are detected. At least one of the plurality of touch locations is associated with the key. A direction is determined based on at least two of the plurality of touch locations and a first character of the at least two characters is selected based on the direction and confirmation of selection.

A portable electronic device includes a touch-sensitive display for displaying a keyboard that has one or more keys. The touch-sensitive display includes an overlay disposed on a display device and a controller connected to the overlay. The portable electronic device also includes an actuator for confirming a selection of any of the one or more keys, and memory and a processor operably connected to the touch-sensitive display, the actuator, and the memory. The memory has computer-readable program code embodied therein and executable by the processor to cause the portable electronic device to carry out the above method.

A computer-readable medium has computer-readable code embodied therein for execution by a processor for carrying out the above method.

A reduced-area keyboard may be rendered with keys associated with one or more user-selectable characters and/or functions. For example, a QWERTY keyboard may be provided with keys associated with multiple characters. A user may touch unintended areas of the touch-sensitive display without selecting a character or function if confirmation of selection has not occurred. Various correlations of touch locations, directions, and confirmation of selection are provided for flexible selection options. Alternatively, a swipe from a first key in the direction of the desired character may be utilized to select characters and functions from an alternative reduced keyboard. Functional areas may be displayed between keys to further reduced keyboard area. Reduced keyboard size and faster character entry with tactile feedback are provided, saving device use time, reducing power requirements, and increasing user satisfaction.

While the embodiments described herein are directed to particular implementations of the portable electronic device and the method of controlling the portable electronic device, modifications and variations may occur to those skilled in the art. All such modifications and variations are believed to be within the sphere and scope of the present disclosure. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   displaying a keyboard on a touch-sensitive display, wherein a key of the keyboard is associated with at least two characters that are arranged in a pattern outside the key;
   detecting a confirmation of selection;
   detecting, on the touch-sensitive display, a first touch location and a second touch location, wherein the first touch location is associated with the key;
   determining a direction based on the first and second touch locations;
   selecting a first character of the at least two characters based on the direction and confirmation of selection.

2. The method according to claim 1, wherein the second touch location is positioned along a line that extends from the key through the first character.

3. The method according to claim 1, wherein at least one of the first and second touch locations is touched while confirmation of selection occurs.

4. The method according to claim 1, wherein detecting the confirmation of selection comprises receiving input from an actuator.

5. The method according to claim 1, wherein detecting the confirmation of selection comprises receiving input from an actuator actuated by depression of the touch-sensitive display.

6. The method according to claim 1, further comprising:
   determining a time of actuation of an actuator;
   comparing the time of actuation to a threshold time;
   changing the at least two characters associated with the key when the time of actuation meets or exceeds the threshold time.

7. The method according to claim 6, wherein changing the at least two characters associated with the key comprises changing to characters other than the at least two characters.

8. The method according to claim 1, further comprising:
   determining a time of actuation of an actuator after selecting the first character;
   comparing the time of actuation to a threshold time;
   changing an attribute of the first character when the time of actuation meets or exceeds the threshold time.

9. The method according to claim 8, wherein changing an attribute of the first character comprises capitalizing the first character.

10. The method according to claim 1, wherein a plurality of keys is displayed for the keyboard and each of the plurality of keys is associated with a function.

11. The method according to claim 1, wherein the first and second touch locations are located anywhere on the touch-sensitive display.

12. A computer-readable storage device having computer-readable code executable by a processor of a portable electronic device for carrying out the method according to claim 1.

13. A method comprising:
displaying a keyboard on a touch-sensitive display, wherein a key of the keyboard is associated with at least two characters;
detecting a confirmation of selection;
detecting, on the touch-sensitive display, a plurality of touch locations, wherein at least one of the plurality of touch location is associated with the key;
determining a direction based on at least two of the plurality of touch locations;
selecting a first character of the at least two characters based on the direction and confirmation of selection;
wherein displaying the keyboard comprises displaying a functional area between keys of the keyboard, wherein the functional area is associated with a function, and selecting the function when the confirmation of selection occurs when one of the plurality of touch locations corresponds to the functional area.

14. The method according to claim 13, wherein the area has at least two functions assigned thereto and selecting the function comprises selecting one of the at least two functions based on the direction.

15. The method according to claim 13, further comprising displaying a plurality of functional areas, wherein each of the functional areas is located between keys of the keyboard and is associated with at least one function.

16. The method according to claim 13, wherein the functional area is displayed near corners of four keyboard keys.

17. The method according to claim 13, wherein when the location of touch prior to receiving the confirmation corresponds to the functional area, causing a vibration in the portable electronic device.

18. A portable electronic device comprising:
a touch-sensitive display;
a processor operably coupled to the touch-sensitive display, and configured to:
display a keyboard on the touch-sensitive display, wherein a key of the keyboard is associated with at least two characters that are arranged in a pattern outside the first key;
detect a confirmation of selection;
detect, on the touch-sensitive display, a first touch location and a second touch location, wherein the first touch location is associated with the key;
determine a direction based on the first and second touch locations;
select a first character of the at least two characters based on the direction and confirmation of selection.

19. A portable electronic device comprising:
a touch-sensitive display;
a processor operably coupled to the touch-sensitive display, and configured to:
display a keyboard on the touch-sensitive display, wherein a key of the keyboard is associated with at least two characters;
detect a confirmation of selection;
detect, on the touch-sensitive display, a plurality of touch locations, wherein at least one of the plurality of touch locations is associated with the key;
determine a direction based on at least two of the plurality of touch locations, wherein the at least two of the plurality of touch location is not associated with the key;
select a first character of the at least two characters based on the direction and confirmation of selection;
wherein a functional area is displayed between keys of the keyboard, wherein the functional area is associated with a function, and the function is selected when the confirmation of selection occurs when one of the plurality of touch locations corresponds to the functional area.

* * * * *